United States Patent [11] 3,590,256

| [72] | Inventor | Teodorico Neeff |
| | | 38-20141 Via Gran Sasso, Milan, Italy |
| [21] | Appl. No. | 838,210 |
| [22] | Filed | July 1, 1969 |
| [45] | Patented | June 29, 1971 |
| [32] | Priority | Mar. 5, 1969 |
| [33] | | Italy |
| [31] | | 13666A/69 |

[54] DEVICE WITH PHOTOELECTRIC BUBBLE INDICATOR FOR THE CHECKING OF GAS-TIGHT CONTAINERS AND THE LIKE BY IMMERSION IN A LIQUID
2 Claims, 1 Drawing Fig.

| [52] | U.S. Cl. | 250/218, 356/198, 73/52 |
| [51] | Int. Cl. | G01h 21/26 |
| [50] | Field of Search | 356/196–198; 250/218; 73/52 |

[56] References Cited
UNITED STATES PATENTS

| 1,613,962 | 1/1927 | Schworetzky | 73/52 |
| 1,926,474 | 9/1933 | Allen et al. | 73/52 |
| 1,995,699 | 3/1935 | Baker et al. | 73/52 |
| 2,333,791 | 11/1943 | Hutchinson, Jr. | 250/218 X |
| 2,961,869 | 11/1960 | Bagno | 73/52X |
| 3,251,218 | 5/1966 | Russell | 73/52 |

*Primary Examiner*—Walter Stolwein
*Attorney*—Browdy and Neimark

ABSTRACT: The disclosure relates to a device for testing gastightness of pressurized containers immersing them in a liquid and counting the bubbles eventually issued from the tested containers. The device essentially comprises a tank containing a liquid into which is dipped a bell provided with a vertical shaft having at least a transparent portion adapted to be filled by the liquid contained in the tank, said transparent portion of the shaft being placed between a light source and a photocell. The container to be tested is immersed in said liquid and the eventual bubbles issued by it are revealed by the photocell and counted by a correlate counting device.

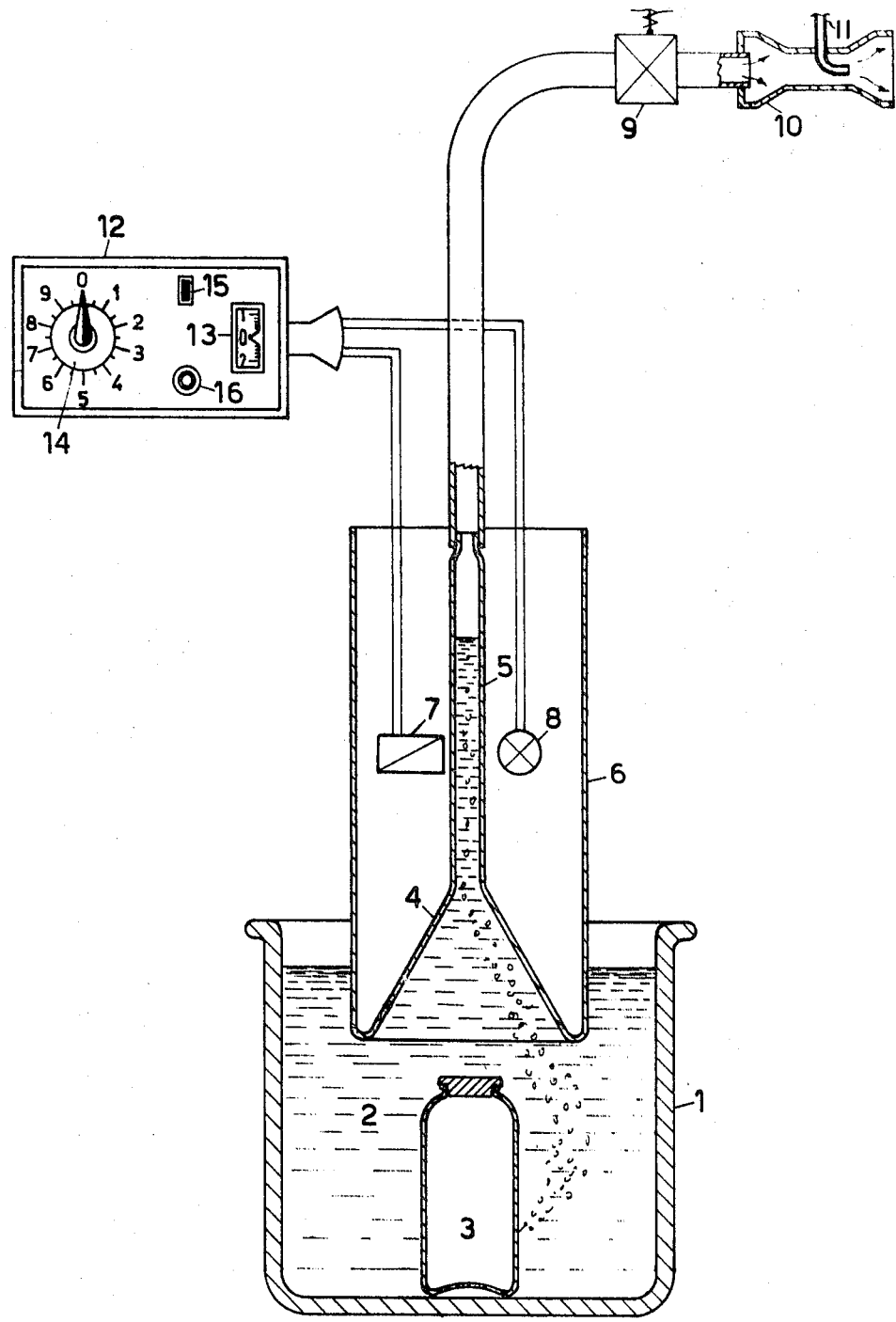

3,590,256

DEVICE WITH PHOTOELECTRIC BUBBLE INDICATOR FOR THE CHECKING OF GAS-TIGHT CONTAINERS AND THE LIKE BY IMMERSION IN A LIQUID

BACKGROUND OF THE INVENTION

This invention refers to a device for checking on the gas tightness of containers under pressure, for example aerosol bombs, tins of food, etc., by immersion in a liquid. Said device may also be used for checking the gas tightness of containers or other articles which are not under pressure, for example taps, valves, empty food tins, etc., into which air must be introduced for checking by immersion.

Many systems and means for checking the gas tightness of containers and the like are already well known. Said well-known systems and means may be classified as follows:

a. systems employing special gases (freon, hydrogen and others) and revealers of these gases;
b. visual observation of losses by way of immersion of the containers in a liquid;
c. observation by way of manometers such as the Bourdon type and diaphragm differential manometer systems (of use only for containers and the like not under pressure).

The above mentioned well-known systems present several disadvantages. For example, these systems as per point a) are not precise and are too complex and delicate; the method of point b) although sufficiently precise, obliges the operator to pay particular attention and keeps him occupied throughout the trial; the method of point c) as well as being unsuitable for containers under pressure is not sufficiently precise. It should also be noted that none of the above mentioned system has a method of automatically indicating any eventual loss shown by the containers under trial.

SUMMARY OF THE INVENTION

The main object of this invention is to provide an immersion type device which will eliminate the foregoing disadvantages of the prior art. Another object of this invention is to provide a device for checking on the gas tightness of containers and the like, which is simple in construction and easy to check on and set up.

An advantage offered by the device according to this invention, is the possibility of counting the bubbles automatically by way of electrical apparatus thus avoiding the heavy work of continual and careful observation on the part of the operator throughout the whole test.

A further advantage is offered by the possibility of altering, at will, the precision of the equipment according to the demands of the test.

Said objects and advantages are achieved according to this invention by means of a device essentially consisting of a tank containing a liquid in which the container to be tested is immersed, a bell dipped into said liquid to collect the eventual bubbles, having a transparent vertical shaft which can be filled to a certain level by the liquid contained in the tank below, said shaft being inserted between the projector and the photoelectric cell of a photoelectric bubble indicator. This latter device is intended as that previously described in the Italian Pat. No. 839,105 filed on July 13, 1968 by the same applicant. Said photoelectric bubble indicator essentially consists of a projector which transmits a ray of light, preferably in a horizontal direction, to a cell situated in a diametrically opposed position, and an impulse counting device which counts the impulses transmitted by the photocell following the passage of gaseous bubbles in the space between the projector and the photoelectric cell.

According to a preferred embodiment of this invention, the above mentioned device is associated with an aspirator of the air contained in the shaft of the bell in order to increase the head between the container being tested and the meniscus of the liquid column in the shaft, which will thus be caused to rise in relation to the surface of the liquid in the trial tank, causing a partial filing of the shaft of the bell.

DESCRIPTION OF THE PREFERRED EMBODIMENTS

The above and other objects, advantages and features of this invention will be evident to those skilled in the art from the following description of an embodiment reported herein as a nonlimiting example, with reference to the single figure of the drawing attached hereto which shows a schematic elevation and partial section of the device subject of the embodiment described.

The figure shows the trial container or tank 1 containing the liquid 2, preferably water, in which the container 3 to be tested, which contains gas under pressure, is immersed.

The liquid 2 may be heated in order to increase the pressure inside the container 3.

Above the container 3, partially immersed in the liquid 2 and if possible arranged in such a way as to be coaxially placed in relation to the container 3 to be tested, there is a bell 4 having a central vertical shaft 5 of glass or other transparent material. An outside wall 6 serves as a protection for the photoelectric unit including the projector 7 and the photoelectric cell 8 situated diametrically opposite each other in respect of the shaft 5. In the illustrate example by way of a depression caused by the device 10, the liquid 2 is raised in the shaft 5 at least up to the level at which the projector 7 and the photocell 8 facing it are arranged. An electrovalve 9 keeps the liquid in the shaft at the desired level after the depression has been created in the shaft itself. Said depression may be caused by any aspirator system so as to be able to create a head of approximately 300 mm. of $H_2O$. A system of depression is shown as an example in the figure in which compressed air from 0 to 2 atmospheres is introduced into a Venturi tube 10 through the duct 11.

The photocell 8, which receives a ray of light, preferably horizontal, from the projector facing it sends its impulses to a signal revealing apparatus 12 including a meter 13 which indicates the number of impulses and that is bubbles issuing from the container being tested, a predisposed commutator 14, a warning light 15 and a verification pushbutton 16. As soon as the meter 13 shows the figure initially predisposed on the commutator 14, the warning light 15 lights up; this warning light may also be connected to an audible signal in order to indicate that the container 3 being tested has an airtightness inferior to the foreseen and established beforehand on the commutator 14. The pushbutton 16 serves to check the correct regulation of the photoelectric unit.

The very simple operation of the apparatus according to this invention is as follows. Having immersed the container to be tested 3 in the liquid 2 contained in the tank 1, the compressed gas contained in the container escapes at the points of imperfect gastightness forming bubbles in the liquid. Said bubbles are collected by the bell 4 and conveyed up in the shaft 5 where they rise until they reach the meniscus of the column of liquid in the shaft 5. Whilst rising the bubbles meet the ray of light coming from the projector 7 and received under normal conditions by the photocell 8.

While intercepting said ray the bubbles deviate it during their rapid passage between the projector 7 and the photocell 8 facing it, thus interrupting for an instant the constant signal sent from the cell 8 to the revealing device 12. Each bubble passing, therefore, causes an instantaneous variation in the continuous signal which is transformed into an impulse which can be counted by the revealing device 12, with a visual indication being given on the scale of the meter 13. A significant and highly sensitive measurement of the loss from the container to be tested is thus obtained.

It is possible to establish in advance on the predisposed commutator 14 a certain number of bubbles beyond which the container being tested shall be considered as being insufficiently gastight. When the number of bubbles counted by the meter 13 is equal to the figure established on the commutator 14, the warning light 15 lights up providing the signal that the container being tested is insufficiently gastight. If on the other hand the number of bubbles counted by the meter 13 does not reach the figure established on the commutator 14, the warning light 15 will not light up showing that the container being tested is sufficiently gastight. In certain cases it may be judged opportune for the warning light 15 to light up both in cases of insufficient gastightness as in those of sufficient gastightness. In this case, the warning light 15 will light up with different colors for example red for insufficient gastightness and green when this is sufficient.

As already mentioned, the device subject of the present invention may also be used to check losses from containers which are not under pressure, for example empty bombs and tins, interception devices such as taps, valves, etc. For this application the only variation to be made to the illustrated and described apparatus consists in adding a system of feeding compressed air into the article to be tested.

Further additions and/or alterations may be made by those skilled in the art to the embodiment described of the device subject of this invention without exceeding its scope.

What I claim is:

1. A device for the checking of gastight containers under pressure by way of immersion of the containers in a liquid comprising a tank containing the liquid into which the container to be tested is immersed, a substantially bell-shaped receiver extending into said liquid at a point above the position at which said container to be tested is immersed, a shaft extending vertically from the upper end of said bell-shaped receiver, said shaft including at least a transparent portion, aspirator means connected to said shaft and operative to cause a column of liquid to rise in said shaft to at least the level of said transparent portion, said aspirator means including valve means operative to maintain the liquid level in said shaft substantially constant, a photoelectric transmitter means mounted on one side of said shaft adjacent the transparent portion thereof, and a photoelectric indicator means adapted to count gas bubbles issuing from said container and passing through said bell-shaped receiver and the transparent portion of said shaft and to provide a positive or negative indication according to whether the number of bubbles counted reaches a predetermined figure or not, said photoelectric indicator means including a photocell receiver mounted adjacent the transparent portion of said vertical shaft and opposite to said photoelectric transmitter means.

2. The device of claim 5 wherein said bell-shaped receiver includes a protective wall extending in spaced concentric relationship to said vertical shaft, the space between said vertical shaft and protective wall being employed to house said photoelectric transmitter means and photocell receiver.